(12) United States Patent
Hryhorenko et al.

(10) Patent No.: US 7,933,545 B2
(45) Date of Patent: Apr. 26, 2011

(54) REDUCING IMAGE ARTIFACT REDUCTION METHOD

(75) Inventors: John L. Hryhorenko, Webster, NY (US); Donna P. Suchy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 93 days.

(21) Appl. No.: 12/378,145

(22) Filed: Feb. 11, 2009

(65) Prior Publication Data

US 2010/0202811 A1    Aug. 12, 2010

(51) Int. Cl.
    *G03G 15/20*    (2006.01)
(52) U.S. Cl. ...................................................... 399/341
(58) Field of Classification Search .................. 399/320, 399/324–325, 341; 358/1.1, 1.18, 1.8, 1.9, 358/466, 526
See application file for complete search history.

(56) References Cited

U.S. PATENT DOCUMENTS

| 5,234,782 A | 8/1993 | Aslam et al. |
| 6,185,002 B1 * | 2/2001 | Askeland et al. ............... 358/1.8 |
| 6,854,828 B2 * | 2/2005 | de Pena ............................ 347/43 |
| 7,016,621 B1 * | 3/2006 | Ng ..................................... 399/53 |
| 7,139,521 B2 | 11/2006 | Ng et al. |
| 7,236,734 B2 | 6/2007 | Ng et al. |
| 2003/0090559 A1 | 5/2003 | Okano et al. |
| 2006/0188301 A1 | 8/2006 | Ng et al. |
| 2007/0280758 A1 | 12/2007 | Ciaschi et al. |

FOREIGN PATENT DOCUMENTS

EP    1 156 398 A2    11/2001
EP    1 727 354 A2    11/2006

* cited by examiner

*Primary Examiner* — Hoan Tran
(74) *Attorney, Agent, or Firm* — Donna P. Suchy

(57) ABSTRACT

Often times the glossing process results in an image artifact consisting of locally lighter image a fixed distance from the lead edge as a print is glossed. This artifact is most visible in areas of medium but consistent image. The present invention provides methods for reducing this artifact.

14 Claims, 5 Drawing Sheets
(3 of 5 Drawing Sheet(s) Filed in Color)

REDUCING IMAGE ARTIFACT REDUCTION METHOD

FIELD OF THE INVENTION

This invention relates to image printing. In particular, this invention relates to optimizing the finishing procedure of a printing process.

BACKGROUND OF THE INVENTION

Electrophotographic ("EP") printing involves transferring toner, or dry ink, to a substrate, such as paper, by means of an electric field and then fusing the toner to the substrate using a combination of heat and pressure. After fusing, the substrate is cooled, and excess charge is removed from the substrate. Conventionally, a release fluid is used during the fusing process to provide release of the substrate from the fusing roller. After fusing, cooling, and removing excess charge, the substrate exits the EP printing device, thereby completing the printing process. The substrate having an image fused thereon by an EP printing process is referred to as a "printed document" and may contain text, one or more images, or both. The low and medium density EP images are typically comprised of a halftone pattern of "dots" of individual dry ink particles. Image density increases as the amount of substrate covered by the dot pattern increases.

Commonly, the printed document subsequently is subjected to a finishing procedure. Examples of finishing procedures include glossing, coating using ultraviolet ("UV") radiation, and lamination. In the case of glossing, the printed document is subjected to a procedure that heats and casts the fused toner on the printed document to give it a glossy appearance. In the case of coating using UV radiation, the printed document is coated with a UV curable fluid and exposed to such UV radiation. In the case of lamination, a coating, such as plastic, is applied to the printed document and is heated under pressure to form a protective coating over the printed document.

For proper glossing, dry ink laydown must be continuous or offset will occur at the edges of the images. Accordingly, an inverse mask that applies more clear dry ink where there is less (or no) image is used. This results in continuous and thick layer of dry ink over the entire surface of print to be glossed.

The high gloss surface is generated by contact between a very smooth belt and a fused image in such a manner that sufficient heat is transferred to the image to cause it to completely conform to the smooth belt.

SUMMARY OF THE INVENTION

Often times a printing process that invents a glossing process results in an image artifact consisting of locally lighter image a fixed distance from the lead edge as a print is glossed. This artifact is most visible in areas of medium but consistent image. The present invention provides methods for reducing this artifact.

These and other aspects, objects, features and advantages of the present invention will be more clearly understood and appreciated from a review of the following detailed description of the preferred embodiments, the Figures, and appended claims.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE INVENTION

For simplicity and illustrative purposes, the principles of the present invention are described by referring to various exemplary embodiments thereof. Although the preferred embodiments of the invention are particularly disclosed herein, one of ordinary skill in the art will readily recognize that the same principles are equally applicable to, and can be implemented in other systems, and that any such variation would be within such modifications that do not part from the scope of the present invention. Before explaining the disclosed embodiments of the present invention in detail, it is to be understood that the invention is not limited in its application to the details of any particular arrangement shown, since the invention is capable of other embodiments. The terminology used herein is for the purpose of description and not of limitation. Further, although certain methods are described with reference to certain steps that are presented herein in certain order, in many instances, these steps may be performed in any order as would be appreciated by one skilled in the art, and the methods are not limited to the particular arrangement of steps disclosed herein.

Figure 1:
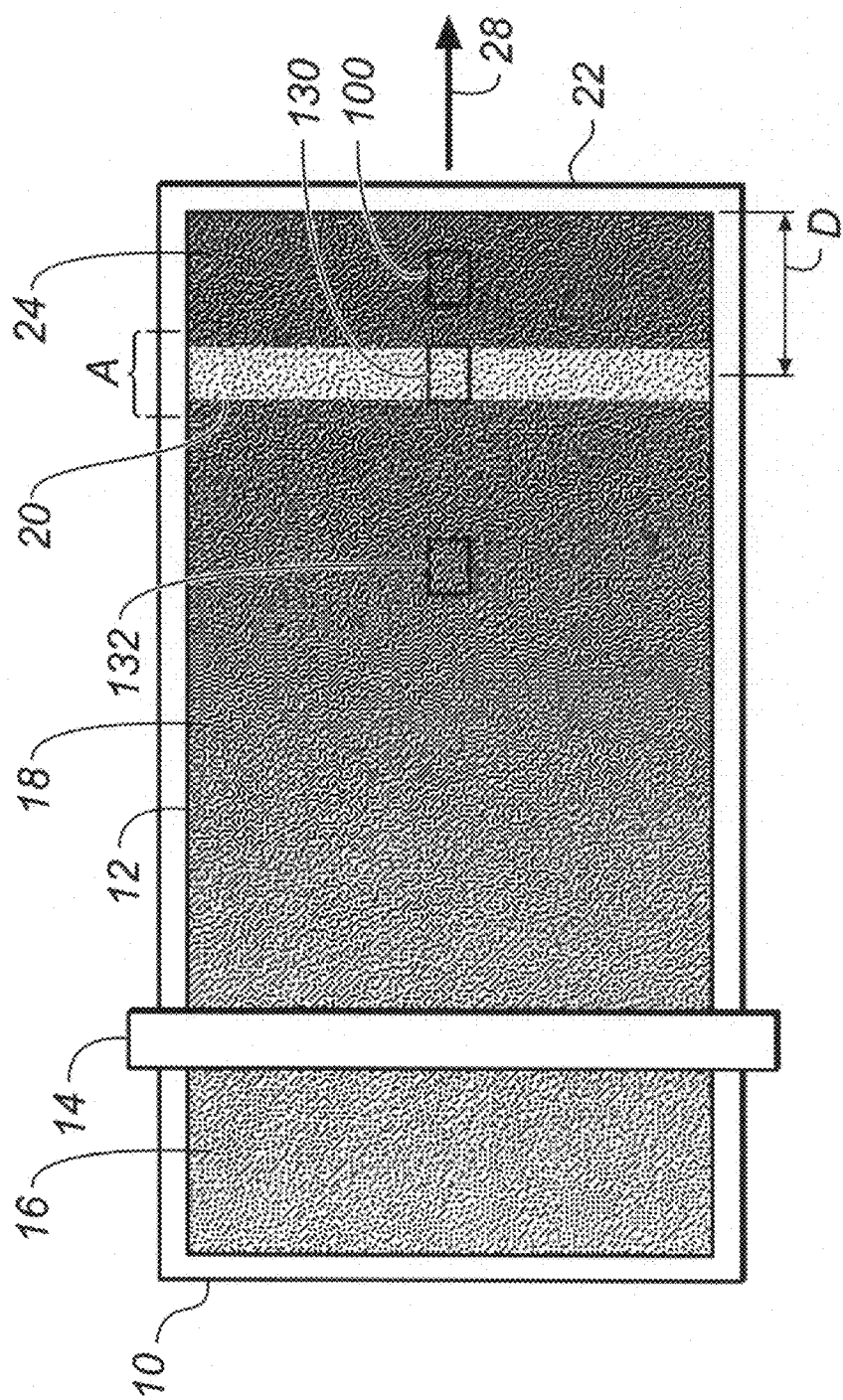
FIG. 1 shows a receiver having a printed image in an incorporated or independent glosser.

The basic mechanism for increased image density (in general or localized) as a print is passed through the glosser is image smear. The glosser can be a stand alone glosser or be incorporated into the printer or even be a separate station or printing module in a printer. As the image dot pattern is smeared, less of the substrate is exposed so that image density is increased. Dry ink image smear may be caused by the combination of at least 5 factors. FIG. 1 represents a receiver 10 that has a printed image 12 that is passing through a glosser nip 14 so that there is an as-printed density of print 16 and an as-glossed density 18 (shown here as increased from as-printed 16 portion) and a reduced as glossed density portion 20 (shown here as a reduced as-glossed image density from the as-printed 16 portion). This is also known and referred to herein as an artifact 20. Finally near the front edge 22 there is an as-glossed image density portion 24 which has a further increased density from the as-printed portion 16. The receiver is shown moving from left to right as represented by the arrow or direction of movement 28. The distance "D" represents the distance the artifact appears from the front edge which is discussed in more detail later in this description and which is represented in the result tables determined from experimentation.

The first is dry ink coverage. Since offset will occur in the glosser at the edges of any image, dry ink coverage must be continuous. The second factor is the glosser pressure roller is driven by the heater roller through the belt, dry ink and paper or in reverse order. Since shear resistance of the dry ink is less than that of the other layers, especially when the dry ink is melted, the force required to rotate the pressure roller will shear the dry ink as the print is glossed. The third factor is differences in the level of shearing within the dry ink layer as the area coverage and thickness of the dry ink layer changes. The maximum change in dry ink area coverage occurs as the image first enters the glosser nip. The fourth factor is growth of the substrate as it passes through the glosser nip, due to thermal expansion. The fifth factor is the tendency of the substrate to stick to the belt in the immediate post nip area, where the dry ink is at its lowest viscosity and thus easiest to smear.

Figure 2:
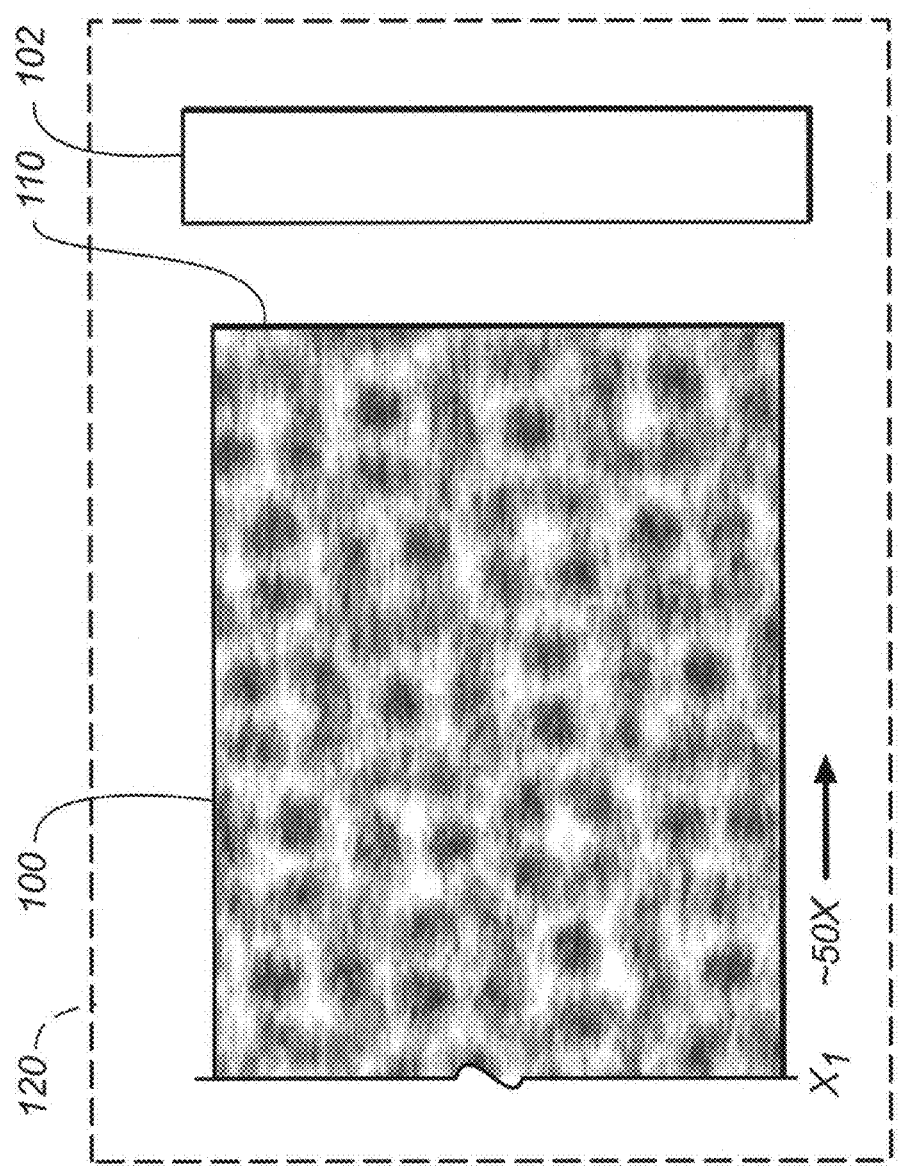
FIG. 2 shows an example of glosser image smear close to the lead edge of the image.
Figure 3:
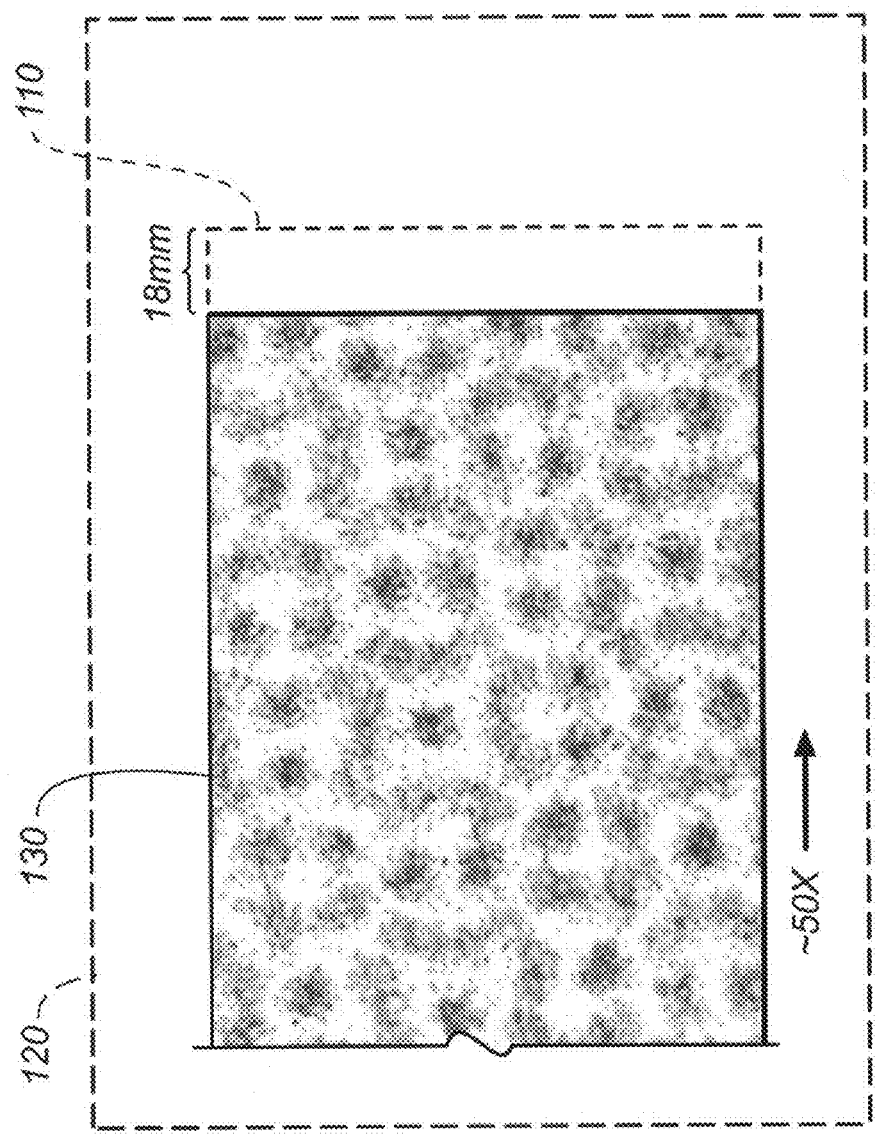
FIG. 3 show image smear in the area where the artifact appears.
Figure 4:
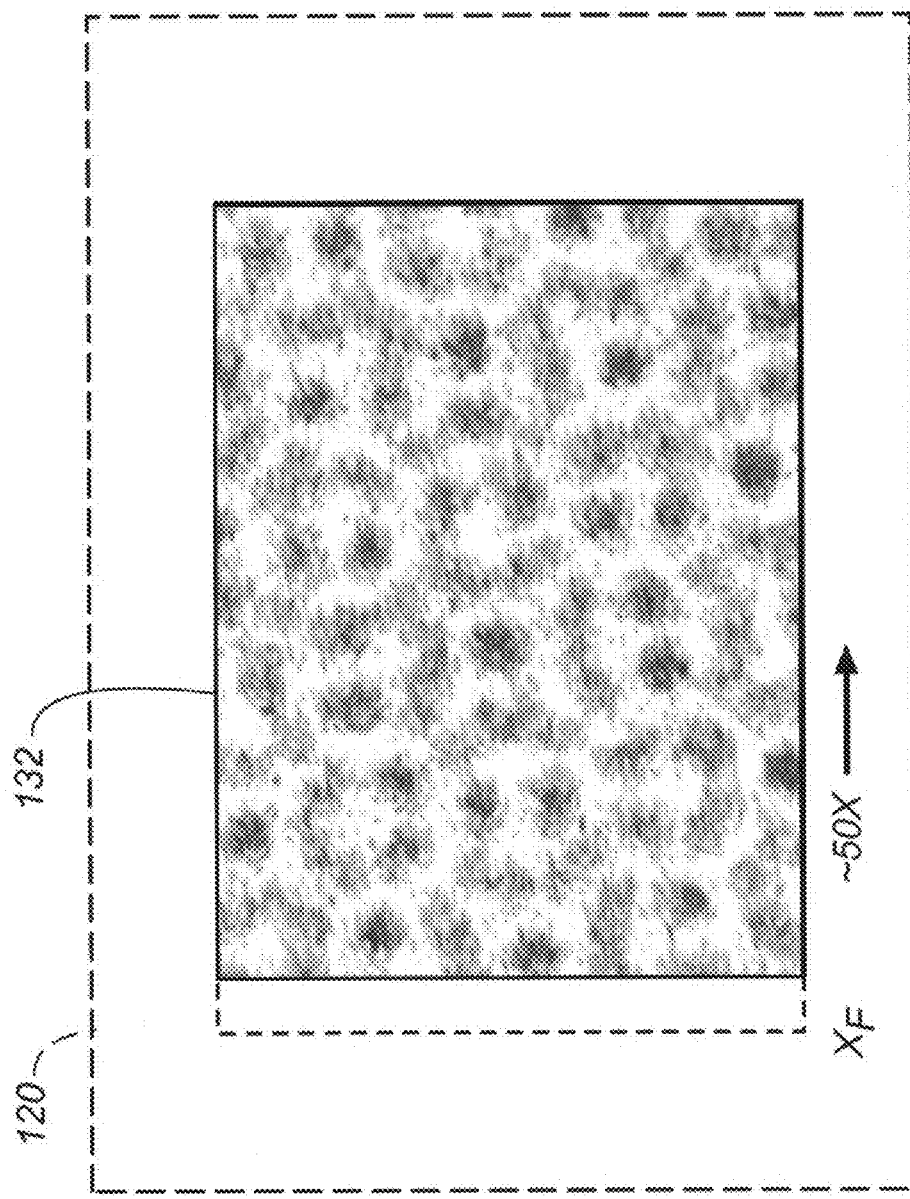
FIG. 4 shows the image smear for the balance of the print.

Taken together, these 5 mechanisms generate image smear that increases image reflection density and color hue. As the sum of the mechanisms change due to changes in levels of the above factors, the magnitude of the changes in density and color hue will also change. This results in locally lighter or darker images which can be unacceptable in terms of image quality. The following figures show examples of this in a series of photomicrographs at about 50× magnification The specific local change in image density 100 is a cross track band of increased image density adjacent to the image lead edge 110 (as it is fed through the glosser 120 in the direction indicated by the arrow) as seen in FIG. 2, then a cross track band 130 of much lower image density (as shown here as a portion of the receiver located left of FIG. 2) after the lead edge of the image as seen in FIG. 3. Finally in FIG. 4 is shown an image density 132 that is higher than the lighter band 130 but lower than the lead edge band 100 for the balance of the print 140, as seen in FIG. 4 towards the end of the print $X_F$.

Figure 5:
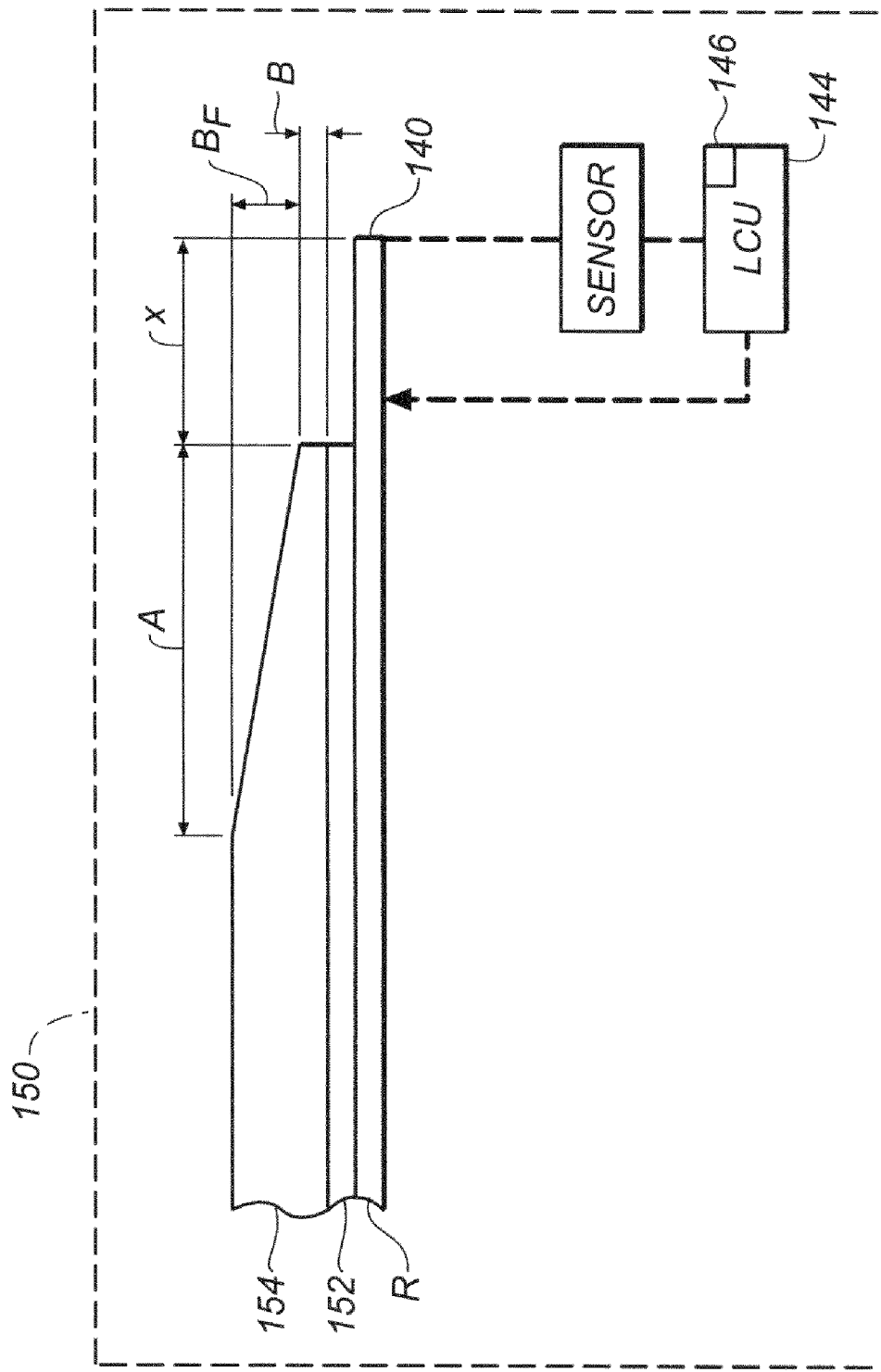
FIG. 5 shows a diagram used in a designed experiment to determine the relationship between the level of the defect and reduction of clear dry ink to the edge of an image in accordance with one embodiment of the present invention.

FIG. 5 shows one embodiment of the invention that is described in more detail below. FIG. 5 shows a receiver R having a leading edge 140 that can be detected by a sensor "S" in the printer which is a well known distance 'x' from the image edge by techniques known to those skilled in the art. A distance "A" can be predetermined to cover the areas that a smear will occur in a particular printer 144 or, alternatively, one or more sensors used to detect an image edge or similar boundary where gloss is desired and a blurred image could occur. These distances can be stored in and accessible tables for the printer memory 146.

The changes in image density described are most visually apparent in areas of consistent, medium image density. The present inventors have discovered that to reduce this effect, the print may be fed through the glosser so that large areas of medium density are towards the trailing edge of the print. This technique is especially preferred if medium density is only on one edge.

The present inventors have also discovered that the effect may be reduced by maximizing the length of clear dry ink in the in-track dimension before the image passes through the glosser nip. To accomplish this, the image should be printed on a larger size paper than the image and the image should be biased towards the lead or the trailing edge as the print passes through the press. Then the other edge should be fed through the glosser first. If the length of clear dry ink (before the image) on the print as it passes through the glosser is 28 mm or more, the differential smear will occur entirely on the clear dry ink and will not be visible. It should be noted that this embodiment requires a secondary trimming operation.

The present inventors have also discovered that the artifact may be reduced by decreasing the glosser temperature. This reduces melting of the dry ink and hence the level of smearing. Unfortunately, image gloss also decreases. The density of the image can also be locally increased or decreased during the EP printing process to compensate for the expected image smear during glossing. In other words, dry ink laydown can be decreased in areas where increased smear is expected and increased in areas where less smear is expected. This technique requires prior knowledge that the print will be glossed and which edge of the print will be fed through the glosser first. One method of glossing is described in the co-owned patent, U.S. Pat. No. 7,139,521 entitled: "Gloss and differential gloss control methodology" which is incorporated by reference.

It has also been discovered that decreasing the maximum amount of clear dry ink at the edges of the image and then gradually increasing the amount of clear dry ink reduces the effect. The amount of clear dry ink laydown may be decreased to 5%-50% at the edges and then gradually increased to levels typically used in printing methods. The laydown percentages are in comparison to a laydown of 100% which is a machine determined density volume of toner per unit area to achieve complete coverage known to those skilled in the art.

Alternatively, the amount of clear dry ink laydown may also be decreased to 10%-25% at the edges and then gradually increased to levels typically used in printing methods. Decreasing the maximum amount of clear dry ink at the edges of the image to 15% and gradually increase to the typical 90% over a length of 30 mm has been shown to produce desirable results. This process requires no intervention or subsequent operations.

A print related artifact can also be minimized by applying additional toner, pigmented or clear, over an artifact created by a low density area. First the artifact or location of a potential artifact is identified as shown in FIG. 1. Then the image is glossed by applying transparent toner over the pre-fused image and fusing the pre-fused image to form a fused print or additional pigmented ink is applied a distance, such as approximately1 8 mm from the front edge of the receiver.

Another embodiment for optimizing an image glossing process includes increasing the maximum amount of pigmented dry ink laydown near the edges of the image where an artifact is expected or detected prior to glossing. This laydown can be an uniform amount that increases the final density of pre-gloss laydown or it can be gradually increased toward the middle of the artifact and decreased toward the far side. By gradually increasing and decreasing the amount of clear dry ink laydown away from the center of the artifact the artifact is less likely to be visible after glossing since there is no sharp limit. The tables below show that the artifact can be expected near the edge, such as 18 mm from the edge but most likely within 30 mm. This laydown is done with pigmented dry ink near the edges of the image and can be decreased and then increased between 50 and 5% or alternatively 25 to 10% or even 15%. The pigmented dry ink laydown can be applied over a length of 30 mm from the edge or within 30 mm of another non-edge artifact that is detected or anticipated.

This method of minimizing the appearance of an artifact can be implemented using a controller with a computer readable media including a code segment for reading an original image from which said printed image is to be made and calculating an original density of a color toner lay-down of said original image, a code segment for calculating an appropriate location of an artifact based on the characteristics of said color toner lay-down of said original image, said desired level of gloss and said substrate, a code segment for applying additional pigmented ink over the artifact location and a code segment for applying the transparent toner over the color toner lay-down and a code segment for fusing an image formed by the color toner lay-down and the transparent toner to form a fused print. Additional code segments can identify a front edge of said receiver so that the additional pigmented ink is applied based on said edge so that it is within 30 mm.

Still another embodiment for optimizing an image glossing process includes decreasing the maximum amount of pigmented dry ink laydown in higher density areas of the image; and gradually increasing the amount of pigmented dry ink laydown in lower density areas of the image resulting in a uniform combined height of pigmented ink before applying a clear ink layer. The amount of pigmented dry ink laydown in the higher or lower density areas of the image can be changed by 50-5%, by 25-10%, or even by as little as 15% to help make the artifact undetectable under normal conditions. This method is especially useful when an artifact repeatedly appears in these low or high density areas.

The method for minimizing print related artifacts on a printed image includes applying pigmented ink onto a receiver to form the pre-fused image, determining an image artifact location on the prefused image, applying additional pigmented ink to a low density area coincident to the artifact location so that the density will appear uniform after glossing, applying transparent toner over the prefused image, and fusing said pre-fused image to form a fused print. A potential image artifact location can be also used instead of an actual artifact and that potential artifact may be obtained from stored information based on experience, such as data in a table 146 in memory 144. When applying the additional pigmented ink it can be in one embodiment laid down approximately1 8 mm from the front edge of the receiver based on experimental data discussed below and more specifically approximately1 6-20 mm from the front edge of the receiver or substarte. The laydown can be even or gradually increased from 16 to 18 mm from the front edge of the receiver and further decreased from 18 to 20 mm from the front edge of the receiver so there is a continuous change in slope. One skilled in the art understands these are just one set of distances and that other combinations may be effective in certain circumstances. The amount of pigmented dry ink laydown in higher density areas of an image artifact area can be decreased by 5-10%, by 10-25% or for large contrast artifacts by 25-50%. The area of treatment is in the image artifact area A that includes the artifact and can include additional adjacent areas up to 2 mm from the image artifact.

Instructions for the application of the pigmented ink is stored in memory 144 in communication with the printer as computer readable media for minimizing artifacts on a printed image including a code segment for reading an original image from which the printed image is to be made and calculating an original density of a color toner lay-down of the original image, a code segment for calculating an appropriate artifact area surrounding an artifact based on the characteristics of the color toner lay-down of the original image, a desired level of gloss and a substrate, a code segment for applying additional pigmented ink in the artifact area, a code segment for applying a transparent toner over the color toner lay-down to achieve the desired level of gloss, and a code segment for fusing an image formed by the color toner laydown and the transparent toner to form a fused print. An additional code segment can be used to identify a front edge of said receiver and applying additional pigmented ink based on the front edge so that it is within 30 mm and further, if needed, for gradually increasing and decreasing the laydown within the 30 mm. An additional code segment may be used to identify the image artifact as a potential image artifact location from stored information.

EXAMPLE 1

Several screen tests were performed to better characterize and understand the defect, which consisted of a cross track area of lower image density that occurred a certain distance from the lead edge of prints from a Kodak NexPress® 2100 plus digital production color press as each was fed through a Kodak NexGlosser® glossing unit.

Factors that had no effect on the defect level were time between printing and glossing, decreased glosser nip width in conjunction with increased glosser temperature, reduced print width, glosser pressure roller cushion thickness and durometer, and glosser pressure roller sleeve material.

The level of the defect was decreased as glosser temperature or nip width was decreased, but this also decreased image gloss below the lower specification limit. The level of the defect was also decreased as the level of clear dry ink was decreased, but this increased print image graininess as the area of each particle of color dry ink was increased in the glosser nip.

Two screen tests clearly showed the defect was caused by relative motion between the glosser belt and the image. Changing the distance between the lead edge of the paper and the lead edge of the image indicated the defect was always a fixed distance (about 18 mm) from the start of the image and not from the lead edge of the paper. In addition, intermittently pulling on the trail edge of print as it passed through the glosser created a similar type of defect that this invention can correct. Photomicrographs of the defect showed the defect was caused by differential smearing of the dry ink. FIG. 2 shows a typical level of image smear of a medium density image as the image first enters the glosser nip 102 as described in co-owned patents U.S. Publication No. 2007/0280758 published on Dec. 6, 2007 in the name of Andrew Ciaschi et al. and U.S. Pat. No. 7,236,735 each of are hereby incorporated by reference. FIG. 3 shows the reduction in image smear as the image is further fed into the glosser nip. FIG. 4 shows the level of image smear for the balance of the print, as glossing is completed. The difference in image smear, between FIG. 3 and FIGS. 2 and 4 causes the difference in image density of the defect that shows up as an artifact.

Two screen tests clearly showed the defect was caused by relative motion between the glosser belt and the image. Changing the distance between the lead edge of the paper and the lead edge of the image indicated the defect was always a fixed distance (about 18 mm) from the start of the image and not from the lead edge of the paper. In addition, intermittently pulling on the trail edge of print as it passed through the glosser created a similar type of defect that this invention can correct. Photomicrographs of the defect showed the defect was caused by differential smearing of the dry ink. FIG. 2 shows a typical level of image smear of a medium density image as the image first enters the glosser nip 102 as described in co-owned patents U.S. Publication No. 2007/0280758 published on Dec. 6, 2007 in the name of Andrew Ciaschi et al. and U.S. Pat. No. 7,236,734 each of are hereby incorporated by reference. FIG. 3 shows the reduction in image smear as the image is further fed into the glosser nip. FIG. 4 shows the level of image smear for the balance of the print, as glossing is completed. The difference in image smear, between FIG. 3 and FIGS. 2 and 4 causes the difference in image density of the defect that shows up as an artifact.

EXAMPLE 2

Two designed experiments compared the level of defect to the amount of clear dry ink reduction and the distance from the lead edge of the image over which the reduction occurred. The level of defect was subjectively determined, but could have been measured using reflective density measurements with differences in level based on a "just noticeable difference" in defect level. The smaller the level of defect, the less visible the defect to an observer. FIG. 4 shows a side view of a receiver R in a glosser (or printer with the ability to laydown clear toner, such as an incorporated glosser) 150 with an image 152 covered by clear ink 154 of varying thickness. The height of the clear ink at the front edge of the image is "B" which is increased over a distance (A) of to a final height of $B_F$ so that there is a reduced laydown over the potentially smearable portions of the image as shown.

There were two judges ("1" and "2") for the first experiment. Table 1 shows the results of the first experiment, in the order in which they were run. Table 2 shows the same results, converted to a matrix of distance and reduction.

TABLE 1

| "Run" | A | B | Defect Level (STB) | |
|---|---|---|---|---|
| | | | 1 | 2 |
| 1 | 15 | 0 | 6 | 6 |
| 2 | 15 | 45 | 6 | 6 |
| 3 | 20 | 15 | 4 | 5 |
| 4 | 20 | 30 | 4 | 5 |
| 5 | 25 | 15 | 3 | 2 |
| 6 | 25 | 30 | 3 | 3 |
| 7 | 30 | 0 | 1 | 1 |
| 8 | 30 | 45 | 2 | 4 |
| Baseline | 0 | 90 | 5 | 5 |

TABLE 2

| | | A | | | |
|---|---|---|---|---|---|
| | | 15 | 20 | 25 | 30 |
| B | 0 | 6.6 | | | 1.1 |
| | 15 | | 4.5 | 3.2 | |
| | 30 | | 4.5 | 3.3 | |
| | 45 | 6.6 | | | 2.4 |

The results of the first experiment defined the levels of the second experiment, as shown in Table 3, in the order in which they were run. There was only one judge of the results of the second experiment. Table 4 shows the same results, converted to a matrix of distance and reduction.

TABLE 3

| "Run" | A | B | Defect Level (STB) |
|---|---|---|---|
| 1 | 25 | 0 | 1 |
| 2 | 25 | 15 | 1.5 |
| 3 | 25 | 30 | 2 |
| 4 | 25 | 45 | 2 |
| 5 | 30 | 0 | 1 |
| 6 | 30 | 15 | 1 |
| 7 | 30 | 30 | 2 |
| 8 | 30 | 45 | 2 |
| Baseline | 0 | 90 | 3 |

TABLE 4

| | | A | |
|---|---|---|---|
| | | 25 | 30 |
| B | 0 | 1 | 1 |
| | 15 | 1.5 | 1 |
| | 30 | 2 | 2 |
| | 45 | 2 | 2 |

The results of the second experiment showed that even though the defect level was reduced by any reduction in clear dry ink laydown near the lead edge as the print was glossed, a reduction to 15% or less over a distance of 25 or 30 mm provided the maximum reduction in defect level. Since more offset will occur as the clear dry ink laydown approaches zero, 15% was selected as the optimum level of reduction. Since the defect level increased at a distance of reduction of 20 mm per the first experiment, 30 mm was selected as the optimum distance of reduction.

The invention has been described in detail with particular reference to certain preferred embodiments thereof, but it will be understood that variations and modifications can be effected within the spirit and scope of the invention.

What is claimed is:

1. A method for minimizing print related artifacts on a printed image comprising:
   a. applying a pigmented ink lay-down onto a receiver to form a pre-fused image;
   b. determining an image artifact location on the prefused image;
   c. applying additional pigmented ink to a low density area coincident to the artifact location so that the density will appear uniform after glossing;
   d. applying transparent toner over the prefused image; and
   e. fusing said pre-fused image to form a fused print.

2. The method of claim 1 further comprising identifying a potential image artifact location, from stored information based on experience.

3. The method of claim 1 further comprising applying the additional pigmented ink approximately1 18 mm from the front edge of the receiver.

4. The method of claim 1 further comprising applying the additional pigmented ink approximately 16-20 mm from the front edge of the receiver.

5. The method of claim 4 further comprising gradually increasing the laydown from 16 to 18 mm from the front edge of the receiver and decreasing from 18 to 20 mm from the front edge of the receiver so there is a continuous change in slope.

6. A method for optimizing an image glossing process comprising decreasing the maximum amount of pigmented dry ink laydown in higher density areas surround an image artifact; and gradually increasing the amount of pigmented dry ink laydown in lower density areas of an image artifact resulting in a more uniform combined height of pigmented ink adjacent of the image or artifact in an artifact area before applying a clear ink layer.

7. The method of claim 6, wherein the amount of pigmented dry ink laydown in higher density areas of an image artifact area is decreased by 5-10%.

8. The method of claim 6, wherein the amount of pigmented dry ink laydown in higher density areas of the image is decreased by 10-25%.

9. The method of claim 6, wherein the amount of pigmented dry ink laydown in higher density areas of the image artifact area is decreased to 25-50%.

10. The method of claim 6 where an image artifact area comprises the artifact and additional adjacent areas up to 2 mm from the image artifact.

11. A computer readable media for minimizing artifacts on a printed image comprising:
   a. a code segment for reading an original image from which the printed image is to be made and calculating an original density of a color toner lay-down of the original image;

b. a code segment for calculating an appropriate artifact area surrounding an artifact based on the characteristics of the color toner lay-down of the original image, a desired level of gloss and a substrate;
c. a code segment for applying additional pigmented ink in the artifact area;
d. a code segment for applying a transparent toner over the color toner lay-down to achieve the desired level of gloss, and a code segment for fusing an image formed by the color toner lay-down and the transparent toner to form a fused print.

12. The computer readable media according to claim 11, further comprising a code segment for identifying a front edge of said receiver and applying additional pigmented ink based on the front edge so that it is within 30 mm.

13. The computer readable media according to claim 12, further comprising a code segment for gradually increasing and decreasing the laydown within the 30 mm.

14. The computer readable media according to claim 11 further comprising a code segment for identifying the image artifact as a potential image artifact location from stored information.

* * * * *